United States Patent [19]
Fennern

[11] Patent Number: 5,185,120
[45] Date of Patent: Feb. 9, 1993

[54] LIQUID AFFECTED SPECTRAL SHIFT REACTOR

[75] Inventor: Larry E. Fennern, San Jose, Calif.

[73] Assignee: General Electric Company, San Jose, Calif.

[21] Appl. No.: 774,445

[22] Filed: Oct. 10, 1991

[51] Int. Cl.⁵ .............................................. G21C 7/00
[52] U.S. Cl. .................................... 376/219; 376/220; 376/209
[58] Field of Search ............... 376/219, 226, 243, 209, 376/220

[56] References Cited

U.S. PATENT DOCUMENTS

| | | | |
|---|---|---|---|
| 3,227,619 | 1/1966 | Plante | 376/219 |
| 3,251,746 | 5/1966 | Jeffries et al. | 376/219 |
| 3,261,755 | 7/1966 | Mostert | 376/219 |
| 3,860,482 | 1/1975 | Wheelock | 376/219 |
| 4,664,878 | 5/1987 | Wilson et al. | 376/328 |

OTHER PUBLICATIONS

Wilkins et al, *Advanced BWR: Design Improvements Build on Proven Technology*, Nuclear Engineering International, reprint Jun. 1986, pp. 1-7 and drawing entitled "The World's Reactors No. 89".

*Primary Examiner*—Donald P. Walsh
*Assistant Examiner*—Frederick H. Voss
*Attorney, Agent, or Firm*—Robert R. Schroeder

[57] ABSTRACT

A method for affecting neutron spectral shift in a reactor core includes providing a liquid poison in a hollow control blade extending into the core, displacing the liquid poison with a first fluid for obtaining a hard neutron spectra during a beginning interval of the core fuel cycle for converting fuel, and then increasing moderating ratio for obtaining a soft neutron spectra during an end interval of the cycle for burning the converted fuel. An exemplary apparatus for practicing the method displaces the liquid poison in the control blade with the first fluid for obtaining the hard neutron spectra. The first fluid may be either replaced, displaced, or added to by a second fluid having a second moderating ratio for obtaining the soft neutron spectra.

21 Claims, 7 Drawing Sheets

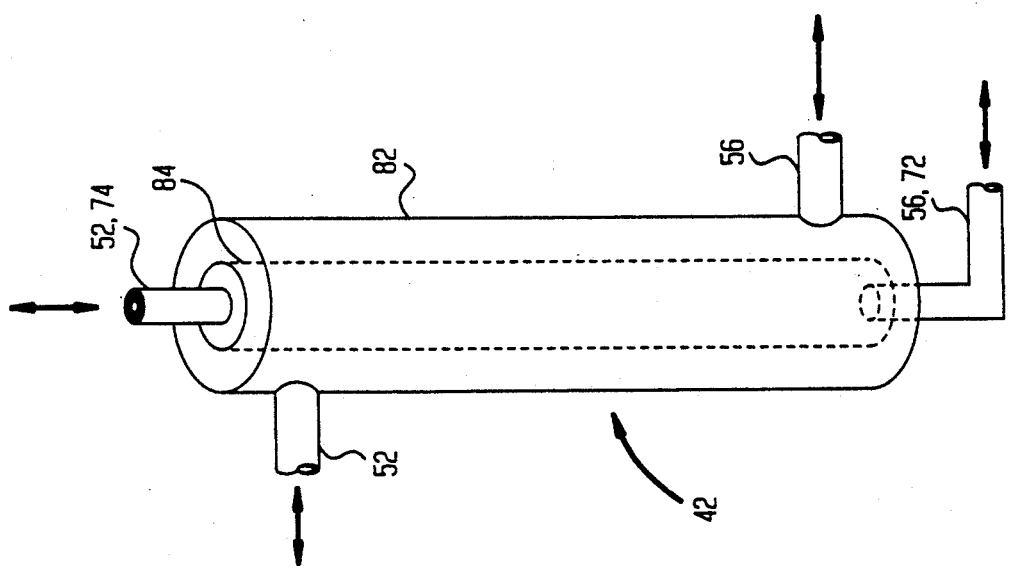

LIQUID AFFECTED SPECTRAL SHIFT REACTOR

TECHNICAL FIELD

This invention relates generally to nuclear reactors, and, more particularly, to a system for controlling nuclear reactivity therein by affecting neutron spectral shift.

BACKGROUND ART

A conventional boiling water reactor includes a reactor pressure vessel within which is disposed a nuclear reactor core having a plurality of fuel bundles. The core is effective for generating heat released from nuclear fission reactions for boiling water contained in the vessel for generating steam to power a steam turbine for driving, for example, an electrical generator for providing power to a utility grid. The reactor core typically includes a plurality of control rods or blades containing solid nuclear poison which are selectively inserted and withdrawn therefrom by conventional control rod drives (CRDs) for controlling the nuclear reaction rate, or reactivity, within the core. A typical nuclear reactor includes a substantial number of control rods and corresponding control rod drives, for example, over 200 of each. The control rod drives are typically mounted externally of the vessel at either the upper or lower closure head of the vessel and have push rods which extend through the vessel and into the reactor core. Conventional CRDs either function hydraulically or electro-mechanically for positioning the control rods within the reactor core.

Fission reactors rely on fissioning of fissile atoms such as uranium isotopes ($U^{233}$, $U^{235}$) and plutonium isotopes ($Pu^{239}$, $Pu^{241}$). Upon absorption of a neutron, a fissile atom can disintegrate, yielding atoms of lower atomic weight and high kinetic energy along with several high-energy neutrons. The kinetic energy of the fission products is quickly dissipated as heat, which is the primary energy product of nuclear reactors. Some of the neutrons released during disintegration can be absorbed by other fissile atoms, causing a chain reaction of disintegration and heat generation. The fissile atoms in nuclear reactors are arranged so that the chain reaction can be self-sustaining.

To facilitate handling, fissile fuel is typically maintained in modular units. These units can be bundles of vertically extending fuel rods. Each rod has a cladding which encloses a stack of fissile fuel pellets. The bundles are arranged in a two-dimensional array in the reactor to form the core. The neutron-absorbing control rods are inserted between or within fuel bundles to control the reactivity of the core.

Both economic and safety considerations favor improved fuel utilization, which can mean less frequent refueling and less exposure to radiation from a reactor interior. In addition, improved fuel utilization generally implies more complete fuel "burnups", or fissioning.

A major obstacle to obtaining long fuel element lifetimes and complete fuel burnups is the inhomogeneities of the neutron flux both radially and axially throughout the core. For example, fuel bundles near the center of the core are surrounded by other fuel elements. Accordingly, the neutron flux at these central fuel bundles exceeds the neutron flux at peripheral fuel bundles which have one or more sides facing away from the rest of the fuel elements. Therefore, peripheral fuel bundles tend to burn up more slowly than do the more central fuel bundles.

The problem of flux density variations with radial core position has been addressed by repositioning fuel bundles between central and peripheral positions. This results in extended fuel bundle lifetimes at the expense of additional refueling operations.

Variations in neutron flux density occur in the axial direction as well as the radial direction. For example, fuel near the top or bottom of a fuel bundle is subjected to less neutron flux than is fuel located midway up a fuel bundle. These axial variations are not effectively addressed by radial redistribution of fuel elements.

In addition to the variations in neutron flux density, variations in neutron spectral distribution affect burnup. For example, in a BWR, neutrons released during fissioning move too quickly and have too high an energy to readily induce the further fissioning required to sustain a chain reaction. These high energy neutrons are known as "fast" neutrons. Slower, lower-energy neutrons, referred to as "thermal" neutrons, most readily induce fission.

In BWRs, thermal neutrons are formerly fast neutrons that have been slowed by moderation primarily through collisions with hydrogen atoms in the water (moderator) used as the heat transfer medium. Between the energy levels of thermal and fast neutrons are "epithermal" neutrons. Epithermal neutrons exceed the desired energy for inducing fission but promote resonance absorption by many actinide series isotopes, converting some "fertile" isotopes to "fissile" (fissionable) isotopes. For example, epithermal neutrons are effective at converting fertile $U^{238}$ to fissile $Pu^{239}$.

Within a core, the percentages of thermal, epithermal and fast neutrons vary over the axial extent of the core. Axial variations in neutron spectra are caused in part by variations in the density or void fraction of the water flowing up the core. In a BWR, water entering the bottom of the core is essentially completely in the liquid phase. Water flowing up through the core boils, so most of the volume of water exiting the top of the core is in the vapor phase, i.e., steam. Steam is less effective than liquid water as a neutron moderator due to the lower density of the vapor phase. Therefore, from the point of view of neutron moderation, core volumes occupied by steam are considered "voids"; the amount of steam at any spatial region in the core can be characterized by a "void fraction". Within a fuel bundle, the void fraction can vary from about zero at the base to about 0.7 near the top.

Continuing the example for the BWR, near the bottom of a fuel bundle, neutron generation and density are relatively low, but the percentage of thermal neutrons is high because of the moderation provided by the low void fraction water at that level. Higher up, neutron density reaches its maximum, while void fraction continues to climb. Thus, the density of thermal neutrons peaks somewhere near the lower-middle level of the bundle. Above this level, neutron density remains roughly stable while the percentages of epithermal and fast neutrons increase. Near the top of the bundle, neutron density decreases across the spectrum since there are no neutrons being generated just above the top of the bundle.

The inhomogeneities induced by this neutron spectral distribution can cause a variety of related problems. Focusing on the top middle-to-upper section, problems of inadequate burnup and increased production of high-level transuranic waste are of concern due to the predominance of fast and epithermal neutrons known as a "hard" neutron spectra, as opposed to a predominance of thermal neutrons known as a "soft" neutron spectra. Since this top section has a hard spectra with a relatively low percentage of thermal neutrons, a higher concentration (enrichment) of fissile fuel is sometimes used to support a chain reaction. If the fuel bundle has a uniform fissile fuel distribution, this section could fall below criticality (the level required to sustain a chain reaction) before the other bundle sections. The fuel bundle would have to be replaced long before the fissle fuel in all sections of the bundle were depleted, wasting fuel.

One conventional method of dealing with neutron spectral axial variations is to use control rods to selectively shape axial power distribution, and, as a consequence, the void distribution, for shifting the neutron spectral distribution. The neutron spectral distribution is shifted so that the core operates with a bottom peaked power distribution and high average void fraction promoting a hard neutron spectra during the early portions of the cycle in order to convert fertile to fissile fuel. Then, the neutron spectra are softened, or shifted, during the later portions of the cycle by operating with a top peaked power distribution and lower average void fraction to burn the additional fissile fuel so produced to extend the cycle.

For the BWR, control rods typically extend into the core from below and contain neutron-absorbing material (i.e. poison) which robs the adjacent fuel of thermal neutrons which would otherwise be available for fissioning. The fuel cycle between refueling can be conventionally extended by maintaining a small percentage (e.g. about 10%) of the control rods fully inserted into the core at the beginning of the cycle to promote a bottom peaked axial power distribution, with the majority being fully withdrawn during operation, i.e. generating power, and then continually withdrawing these shaping control rods during the cycle. In this way, a hard-to-soft neutron spectra distribution is initially effected from the top-to-bottom, respectively, of the fuel rods due to the resulting increasing void fraction from bottom-to-top of the fuel rods which also promotes power generation from the bottom of the core. As the shaping control rods are increasingly withdrawn from the core during the cycle, thier poisoning effect is correspondingly removed from the upper levels of the core thusly shifting upwardly the power distribution and softening the entire neutron spectral axial distribution due to reduction in the void fraction. Thus, control rods can be used to modify the distribution of thermal neutrons over axial position to achieve more complete burnups. However, control rods provide only a gross level of control over spectral distribution.

More precise compensation for spectral variations can be implemented using enrichment variation and burnable poisons. Enrichment variation using, for example, $U^{235}$ enriched uranium, can be used near the top of a fuel bundle to partially compensate for a localized lack of thermal neutrons. Similarly, burnable poisons such as gadolinium oxide ($Gd_2O_3$), can balance the exposure of bundle sections receiving a high thermal neutron flux. Over time, the burnable poisons are converted to isotopes which are not poisons so that more thermal neutrons become available for fissioning as the amount of fissile material decreases. In this way, fissioning can remain more constant over time in a section of the fuel bundle. By varying the amount of enrichment and burnable poisons by axial position along a bundle, longer and more complete burnup cycles can be achieved before refueling is required. In addition, the enrichment and poison profiles can be varied by radial position to compensate for radial variations in thermal neutron density.

Another conventional method used to affect neutron spectral axial distribution to extend fuel burn cycles is to initially decrease recirculation flow through the core to increase the average void fraction which, therefore, increases the neutron spectral hardness for converting fertile fuel to fissile fuel. Then later in the cycle, the recirculation flow can be increased to decrease average void fraction, and therefore soften the neutron spectra and burn the additional fissile fuel so produced.

Nonetheless, taken together, the use of control rods, recirculation flow control, radial positional exchange of bundles, selective enrichment and distribution of burnable poisons still leave problems with axial variations in burn rates and neutron spectra. Furthermore, none of these employed methods effectively address the problem of the high level of fissile material produced and left in the upper-middle sections of the bundle due to the high level of epithermal neutrons and the low level of thermal neutrons. What is needed is a system that deals more effectively with axial variations in neutron spectra so that higher fuel burnups are provided and so that high-level waste is minimized.

OBJECTS OF THE INVENTION

Accordingly, one object of the present invention is to provide for more thorough fuel burnups to enhance fuel utilization and minimize active waste products.

Another object of the present invention is to provide a new and improved system for affecting neutron spectral shift in a reactor core for operating the core with a hard neutron spectra initially in the fuel cycle for fuel conversion and then with a soft neutron spectra at the end of the cycle to burn fissile fuel so produced.

DISCLOSURE OF INVENTION

A method for affecting neutron spectral shift in a reactor core includes providing a liquid poison in a hollow control blade extending into the core, displacing the liquid poison with a first fluid for obtaining a hard neutron spectra during a beginning interval of the core fuel cycle for converting fuel, and then increasing the moderating ratio for obtaining a soft neutron spectra during an end interval of the cycle for burning the converted fuel. An exemplary apparatus for practicing the method includes means for displacing the liquid poison in the control blade with the first fluid for obtaining the hard neutron spectra. Exemplary means are provided for either replacing or displacing with, or adding to the first fluid a second fluid having a second, higher moderating ratio for obtaining the soft neutron spectra.

BRIEF DESCRIPTION OF DRAWINGS

The novel features characteristic of the invention are set forth and differentiated in the claims. The invention, in accordance with preferred and exemplary embodiments, together with further objects and advantages thereof, is more particularly described in the following detailed description taken in conjunction with the accompanying drawings in which:

FIG. 6 is a schematic representation of the second embodiment of the present invention showing the control blade illustrated in FIG. 5 operating in the hard neutron spectra mode.

FIG. 7 is a schematic representation of the second embodiment of the present invention showing the control blade illustrated in FIG. 5 operating in the soft neutron spectra mode.

FIG. 8 is a schematic representation of an alternate embodiment of a hollow control blade usable in the neutron spectral shift system of the present invention.

MODE(S) FOR CARRYING OUT THE INVENTION

Figure 1:
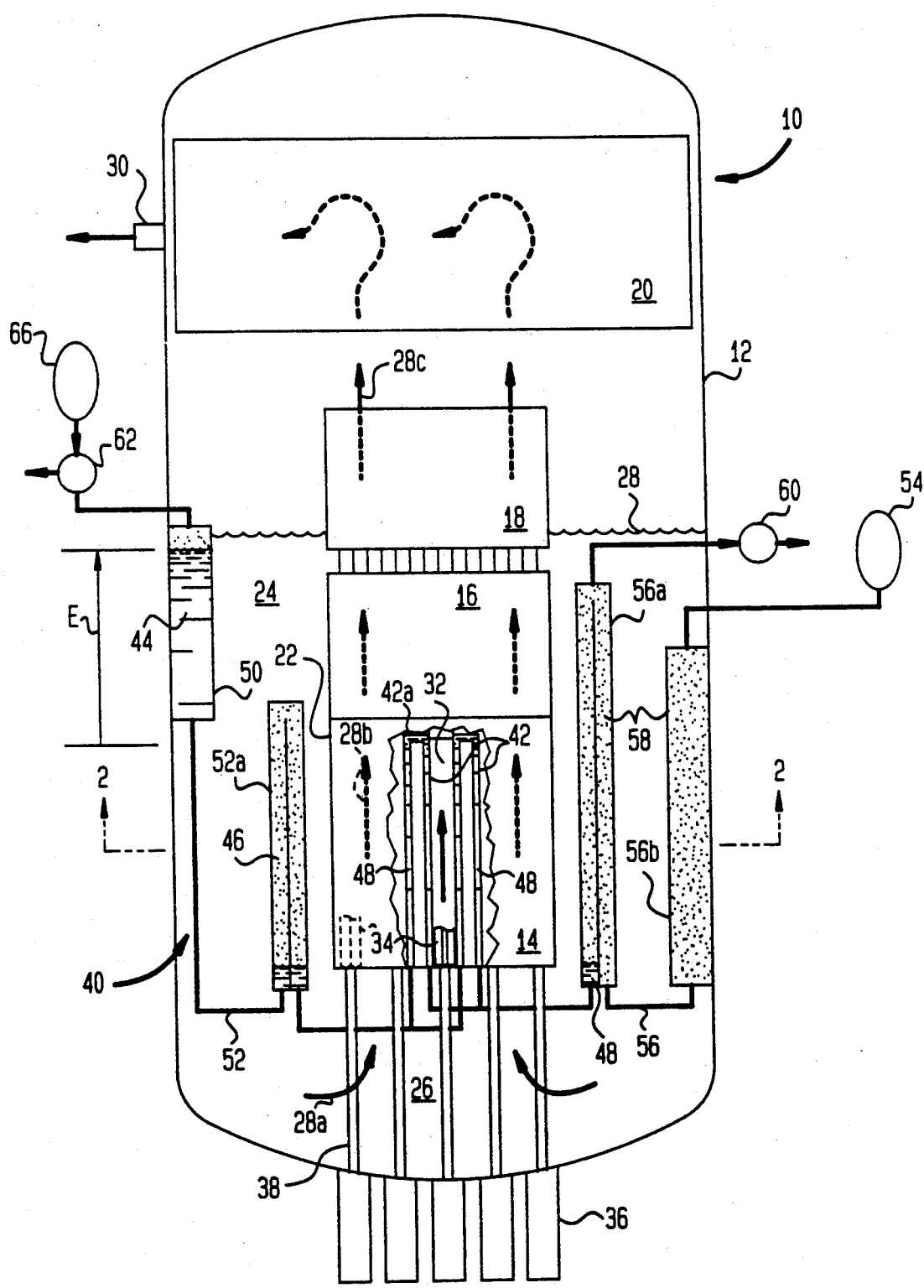
FIG. 1 is a schematic representation of a nuclear reactor including a system for shifting neutron spectra in accordance with a first embodiment of the present invention, operating in a soft neutron spectra mode.

Illustrated in FIG. 1 is an exemplary boiling water reactor (BWR) 10 having a vertically disposed cylindrical reactor pressure vessel 12. Conventionally disposed in the vessel 12 in serial flow communication are a reactor core 14, an upper plenum 16, a steam separator 18, and a steam dryer 20. Surrounding the core 14 is a conventional core shroud 22 which extends upwardly along the outer boundary of the core 14 and is radially spaced inwardly from the vessel 12 to define a conventional annular downcomer 24. Disposed between the core 14 and the lower head of the vessel 12 is a conventional lower plenum 26.

The reactor 10 is partially filled with water 28 which enters the bottom of the core 14 from the lower plenum 26 as inlet water 28a which is boiled by the core 14 during operation for generating a water/steam mixture 28b which rises through the upper plenum 16 to the steam separator 18. In the steam separator 18, a majority of the moisture in the water/steam mixture 28b is conventionally removed, with the remaining steam 28c then rising to the dryer 20 wherein remaining moisture may be removed before being discharged from the vessel 12 through a conventional outlet nozzle 30.

Figure 2:
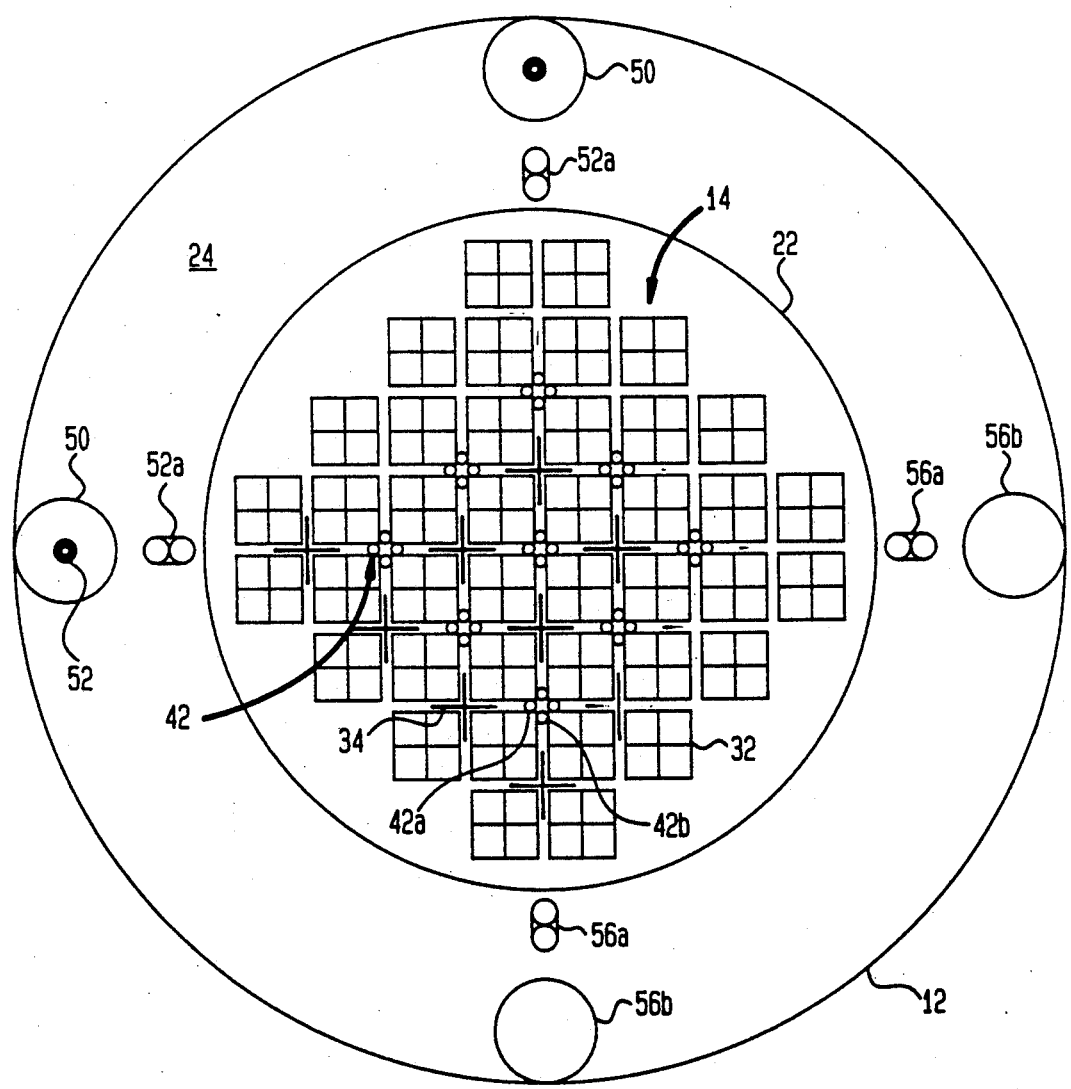
FIG. 2 is a transverse sectional view of the reactor illustrated in FIG. 1 taken along line 2—2.

The core 14 includes a plurality of vertically extending and laterally spaced apart conventional fuel bundles 32 arranged in a conventional 2-D matrix or array as illustrated in FIG. 2. In this exemplary embodiment, a plurality of conventional, vertically translatable control blades 34 are provided between adjacent fuel bundles 32. A respective plurality of conventional control rod drives (CRDs) 36 are fixedly joined externally to the lower head of the vessel 12 and include actuation rods 38 joined to respective control blades 34 for selectively inserting into and withdrawing from the core 14 the control blades 34 for controlling reactivity therein. In this exemplary embodiment, the fuel bundles 32 are square in cross section, and the blades 34 each has a cruciform cross section and is positioned between four adjacent fuel bundles 32. The control blades 34 include a conventional solid nuclear poison for absorbing neutrons when inserted into the core 14, effective for obtaining shutdown for example.

In conventional operation of the reactor 10, the control blades 34 are withdrawn from the core 14 and fission reactions of the fuel within the fuel bundles 32 generate heat for boiling the water 28 to generate the steam 28c. The core 14 has a fuel cycle over which the fuel in the fuel bundles 32 progressively burns, i.e., fissions, until the fuel is depleted, thusly requiring refueling of the core 14. The fission reactions of the fuel in the core 14 generate neutron spectra, or a spectral distribution which varies within the core 14. As described above, various conventional techniques exist for shifting the neutron spectra from hard to soft during the core fuel cycle in order to convert fertile fuel in the core 14 to fissile fuel during a beginning or early interval of the fuel cycle and then burn such produced fissile fuel during the late or end interval of the fuel cycle, which thusly prolongs the fuel cycle for more efficiently utilizing the fuel therein and reducing costs of operating the reactor 10. The cycle beginning interval starts upon initial start-up of the core with new or replenished fuel and ends at any desired intermediate point in the cycle. The cycle end interval then begins and ends upon substantially complete burnup of all remaining fissile fuel, thusly requiring refueling of the core leading to the next fuel cycle.

In accordance with the present invention, a system 40 is provided for additionally affecting or obtaining neutron spectral shift in the core 14. In an exemplary first embodiment, the neutron spectral shifting system 40 includes the reactor core 14 having a plurality of preferably vertically extending and laterally spaced apart stationary, hollow control blades 42 disposed between the fuel bundles 32 as illustrated in more particularity in FIG. 2. In the exemplary embodiment illustrated, the hollow control blades 42 are used in addition to the conventional solid control blades 34. However, in alternate embodiments, the hollow control blades 42 may also replace all of the solid control blades 34.

Figure 3:
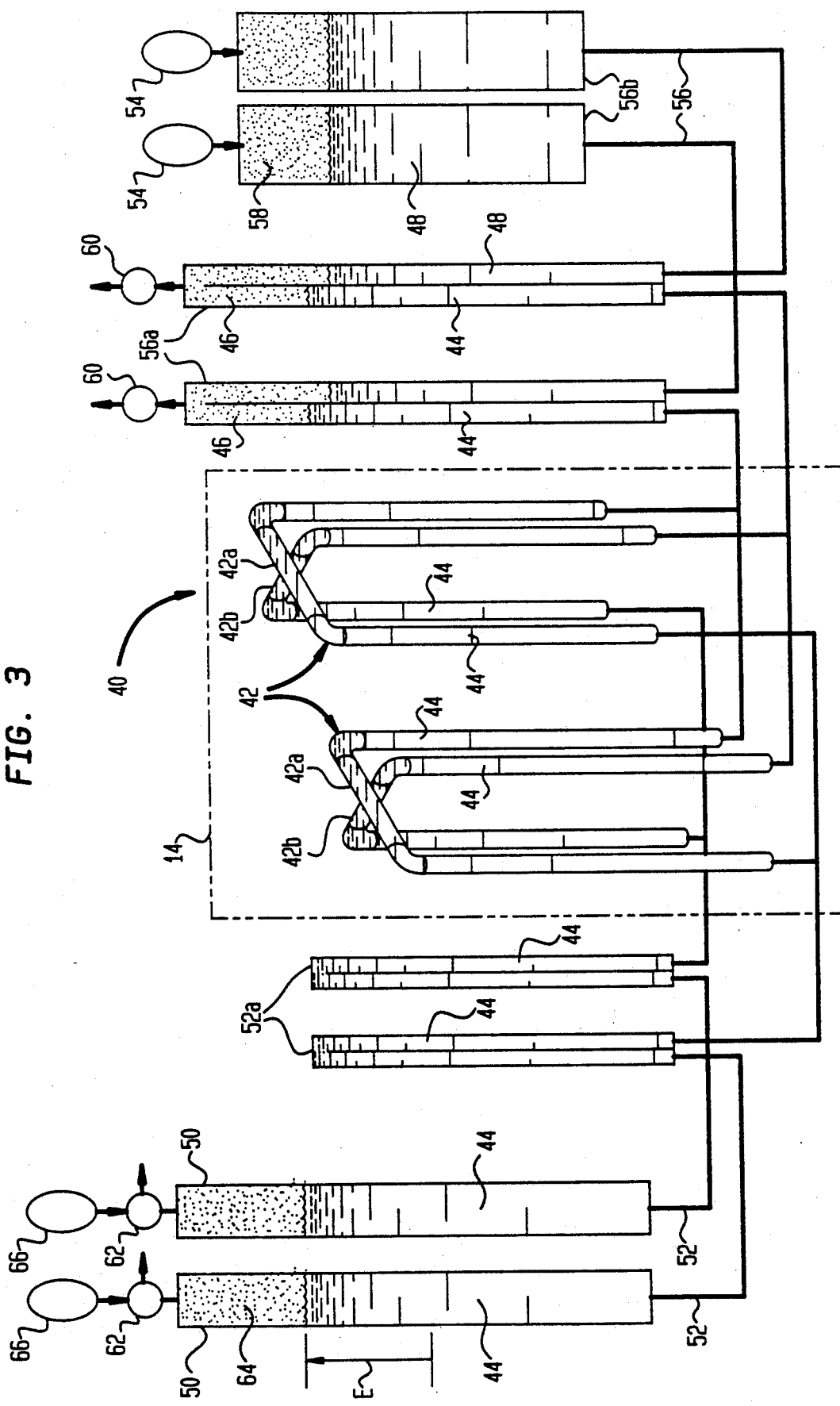
FIG. 3 is a schematic representation of the first embodiment of the neutron spectral shifting system illustrated in FIG. 1 operating in a core shutdown mode.

Utilizing the hollow control blades 42, the method of the present invention includes providing a liquid nuclear poison 44, as shown for example in FIG. 3, in all of the hollow control blades 42 which is affective for absorbing neutrons for reducing nuclear reactivity in the core 14. The control blades 42 may alone, or in conjunction with the control blades 34, have sufficient liquid poison 44 to reduce reactivity below criticality in the core 14 for obtaining shutdown. The liquid nuclear poison 44 may comprise any conventional liquid poison such as, for example, sodium pentaborate in a water solution, or liquid mercury alone.

Figure 4:
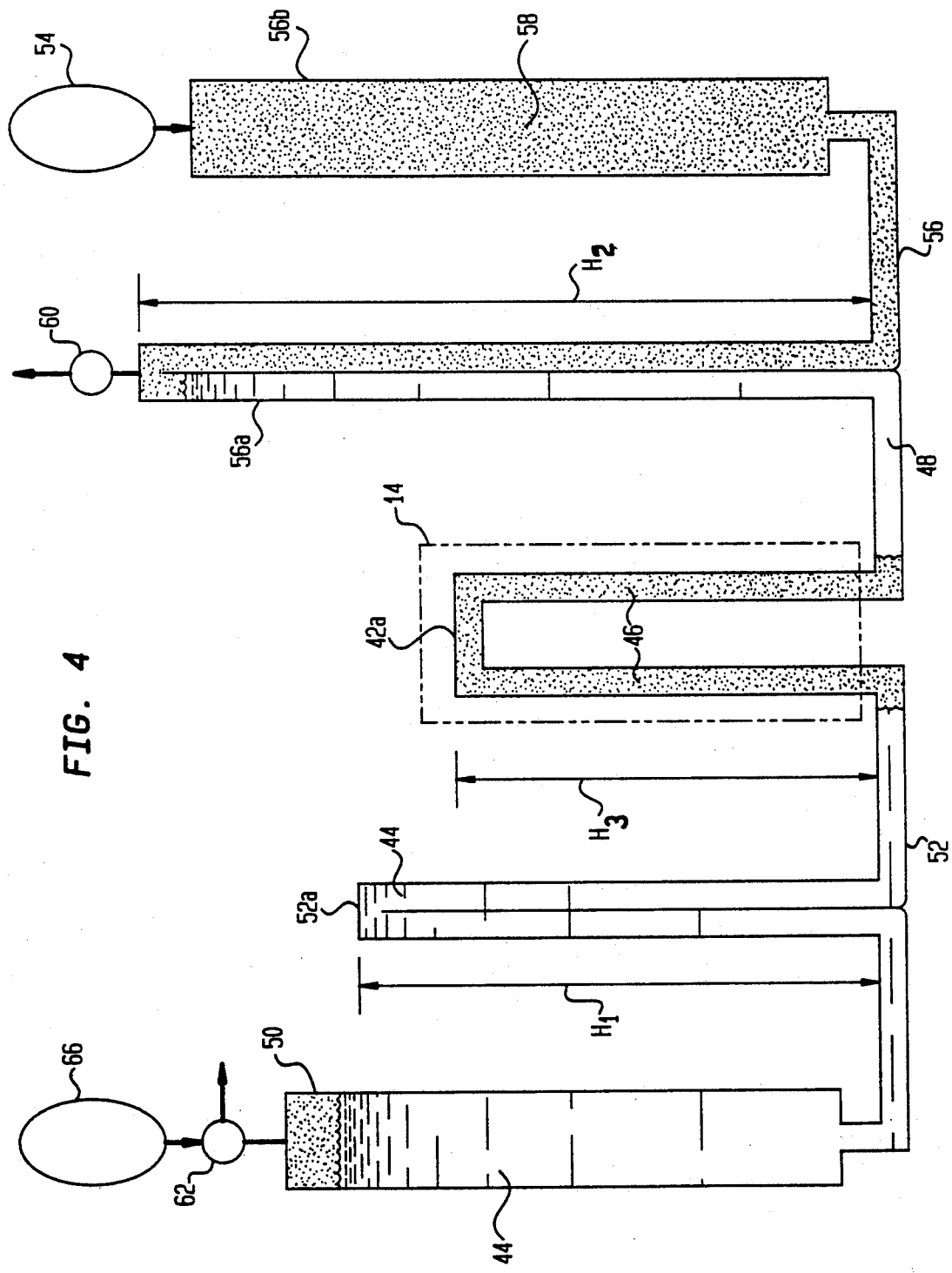
FIG. 4 is a schematic representation of the first embodiment of the present invention shown operating in a hard neutron spectra mode.

In order to operate the core 14 for generating power the method includes displacing the liquid poison 44 in at least a first one of the blades 42 designated 42a, and preferably in all of the blades 42, with a first displacing or moderating fluid 46 as illustrated for example in FIG. 4. The first fluid 46 has a first moderating ratio for obtaining a hard neutron spectra adjacent to the blades 42 during the beginning interval of the fuel cycle for converting fertile fuel in the fuel bundles 32 to fissile fuel. The first fluid 46 may, for example, be a gas such as nitrogen ($N_2$) which upon displacing the liquid poison 44 from the control blades 42 is effective for obtaining the hard neutron spectra during the beginning interval of the fuel cycle in order to convert fertile fuel such as $U^{238}$ to fissile fuel $Pu^{239}$.

The method further includes increasing the moderating ratio effected by the control blades 42 to shift the neutron spectra from hard for obtaining a soft neutron spectra adjacent to the control blades 42 during the end interval of the fuel cycle for burning the fissile fuel so produced, in addition to burning the originally provided fissile fuel in the core 14. In the exemplary embodiment illustrated in FIG. 1, the moderating ratio is increased by displacing or replacing the first fluid 46 in the control blades 42 with a second displacing or moderating fluid 48 as shown in FIG. 1. The second fluid preferably has a second moderating ratio which is greater than the first moderating ratio for obtaining the soft neutron spectra. For example, the second fluid 48 illustrated in the exemplary embodiment shown in FIGS. 1-4 is a liquid such as conventional light or heavy water.

Moderation, and moderating ratio are conventionally known terms used to define the ability to slow neutrons to thermal energies for increasing probability of fissioning to sustain reactor operation. For example, nitrogen has a heavy atomic mass (atomic mass weight=14) and a high absorption cross section (1.75 barns at 0.025 eV) relative to helium, for example, (atomic mass weight=4 and a microscopic absorption cross section of about zero barns). Displacing the poison 44 with nitrogen results in a hard spectra due to the low moderating ratio thereof, which is even lower than is the case when the water 28 displaces the control blades 34 as they are withdrawn. When the water second fluid 48 displaces the nitrogen first fluid 46, the increased moderating ratio thereof results in the desired soft neutron spectra relative to the hard spectra effected by the nitrogen. It is noted that the moderating ratio of water and helium are about the same, and helium may also be used in another embodiment described below.

In order to shutdown the core 14, the liquid nuclear poison 44 is allowed to completely fill the hollow control blades 42 for absorbing neutrons in the core 14, as shown in FIG. 3. And, in order to operate the core 14 with the hard neutron spectra during the beginning interval of the core fuel cycle, the first fluid 46 completely replaces the liquid poison 44 in the hollow control blades 42 as illustrated in FIG. 4. And further, in order to operate the core 14 with the soft neutron spectra during the end interval of the core fuel cycle, the first fluid 46 is then completely replaced by the second fluid 48 in the hollow control blades 42 as illustrated in FIG. 1.

In the exemplary first embodiment illustrated in FIGS. 1-4, means in the exemplary form of a poison reservoir 50 and a first conduit 52 are shown for providing the poison 44 in one or more of the control blades 42 for reducing nuclear reactivity in the core 14. The first conduit 52 joins the reservoir 50 in flow communication with at least one of the control blades 42, and the reservoir 50 is preferably elevated at least in part higher than the control blades 42 so that gravity acting on the poison 44 contained in the reservoir 50 is effective for moving the poison 44 through the first conduit 52 for completely filling the control blades 42 joined thereto as shown in FIG. 3 for automatically shutting down the core 14 as described in more detail below. This may be accomplished by positioning the reservoir 50 so that the elevation E of the top of the poison 44 therein remains higher than the top of the control blades 42 at all times. In this way, the poison 44 in the blades 42 will be displaced into the first conduit 52 and in turn into the reservoir 50 against the force of gravity acting on the poison 44 therein so that the poison 44 is automatically returned into the control blades 42 by gravity upon cessation of the displacing method step.

More specifically, means for displacing the liquid poison 44 from the control blades 42 include a conventional pressure means or source 54 as shown in FIGS. 1, 3, and 4, and a second conduit 56 joining the pressure source 54 in flow communication with the control blades 42. The pressure source 54 may be a conventional pump, or a conventional pressure accumulator effective for selectively pressurizing the first fluid 46 to selectively displace the poison 44 from the control blades 42 through the first conduit 52 and into the reservoir 50 against the force of gravity. In the exemplary embodiment illustrated, the second conduit 56 contains both the first fluid 46 and the second fluid 48, with the first fluid 46 being disposed between the poison 44 and the second fluid 48. The pressure source 54 preferably provides a displacing fluid 58 such as nitrogen gas ($N_2$) into the second conduit 56 for pressurizing the second fluid 48 and in turn the first fluid 46 to displace the liquid poison 44.

More specifically, FIG. 3 illustrates the system 40 in the shutdown mode with the displacing fluid 58 being at a relatively low pressure for allowing gravity to completely fill the control blades 42 with the poison 44 from the reservoir 50. The pressure source 54 may then be used to selectively increase the pressure of the displacing fluid 58 to in turn selectively pressurize the second fluid 48 for displacing in turn the first fluid 46 and the poison 44 so that only the first fluid 46 as illustrated in FIG. 4 is contained in the control blades 42 during the fuel cycle beginning interval for affecting the hard neutron spectra in the core 14, with the poison 44 from the control blades 42 being displaced upwardly into the reservoir 50. The pressure source 54 may further increase the pressure of the displacing fluid 58 for again further displacing in turn the second fluid 48, the first fluid 46 and the poison 44 so that only the second fluid 48 is in the control blades 42 as illustrated in FIG. 1 during the fuel cycle end interval for affecting the soft neutron spectra.

In this exemplary embodiment, the poison 44 is a liquid, the first fluid 46 is a gas (e.g. nitrogen), and the second fluid 48 is a liquid (e.g. light or heavy water) so that three discrete substances having differing moderating affects on the neutrons in the core 14 are separately contained in the control blades 42 without appreciable mixing therebetween. To further prevent appreciable mixing of the poison 44, first fluid 46, and the second fluid 48, the control blades 42 are preferably in the form of an inverted U-shaped trap, the first conduit includes a first inverted U-shaped trap 52a, and the second conduit 56 includes an inverted U-shaped second trap 56a.

As illustrated in FIG. 4 for example, the first, second, and blade traps 52a, 56a, and 42a have respective first, second, and third vertical heights $H_1$, $H_2$, and $H_3$. These heights are selected so that the liquid second fluid 48 is disposed fully in the control blade 42a (trap) and between the first and second traps 52a 56a for obtaining the soft neutron spectra during the fuel cycle end interval as shown in FIG. 1. In the mode of operation illustrated in FIG. 1, the gaseous first fluid 46 and the gaseous displacing fluid 58 are trapped in the respective first and second traps 52a and 56a, with the liquid second fluid 48 being trapped in the control blades 42 between the first and second traps 52a and 56a. The pressurized first fluid 46 and displacing fluid 58 ensure that the second fluid 48 remains in the control blades 42 and does not flow outwardly therefrom and past the respective first and second traps 52a and 56a.

Furthermore, the several traps also ensure that only the gaseous first fluid 46 is contained in the control blades 42, e.g. 42a, during the fuel cycle beginning interval for obtaining the hard neutron spectra as illustrated in FIG. 4. In this mode of operation, the gaseous first fluid 46, having a density less than that of both the poison 44 and the second fluid 48, rises relative thereto for completely filling the control blade 42a. The liquid poison 44 and liquid second fluid 48 remain in the respective first and second conduits 52 and 56 below the control blade 42a by the force of gravity and by the resulting pressure of the pressurized gaseous first fluid 46 in the control blade 42a.

In the first embodiment, the second conduit 56 preferably also includes a second reservoir 56b, which may simply be an enlarged diameter portion of the second conduit 56, disposed in flow communication between the second trap 56a and the pressure source 54 for receiving at least part of the second fluid 48 from the second conduit 56 upon depressurization of the second fluid 48 as shown in FIG. 3. Depressurization of the second fluid 48 may be selectively effected by decreasing the output pressure of the pressure source 54 to shutdown the core 14, or may occur upon failure of the pressure source 54. In either case, gravity will force the poison 44 from the reservoir 50 back into the control blades 42 to ensure a prompt shutdown of the core 14.

As shown in FIG. 3, a plurality of the first control blades 42a are preferably disposed in parallel flow with the first and second conduits 52 and 56 so that an individual reservoir 50 may simultaneously feed several of the control blades 42 in parallel fashion. Furthermore, a plurality of the individual neutron spectral shift systems 40 are preferred for providing redundancy of operation, as well as for providing smoother transition from the hard to the soft neutron spectra. More specifically, two identical parallel systems 40 are illustrated in FIG. 3 with one system having a plurality of the first control blades 42a, and the second system having a plurality of identical, second control blades 42b. Since in this exemplary embodiment, the control blades 42, e.g. 42a, 42b, contain either the poison 44, or the first fluid 46, or the second fluid 48, the parallel systems 40 allow a more gradual shift of the neutron spectra by independently and consecutively displacing the first fluid 46 from the control blades 42 by the second fluid 48. For example, the first fluid 46 may be displaced from the first control blades 42a while it remains in the second control blades 42b. The first fluid 46 may later be displaced from the second control blades 42b by the second fluid 48 as desired. Although two parallel systems 40 having the first and second control blades 42a, 42b respectively are illustrated, more parallel systems may be provided as desired.

Referring also to FIG. 2 in addition to FIG. 3, the first and second control blades 42a and 42b of the parallel systems 40 may be disposed together, in a cruciform spacing configuration for example, at many laterally spaced apart locations in the radial array of the core 14. In this way, the neutron spectra may be shifted more gradually throughout the radial extent of the core 14 by consecutively displacing over the core fuel cycle the first fluid 46 from the respective control blades 42 of the parallel systems 40.

Referring again to FIG. 3, for example, disposed at the top of the second trap 56a in flow communication therewith is a conventional venting valve 60 which may be used as desired to relieve by venting some of the pressure of the gaseous first fluid 46 or the gaseous displacing fluid 58 alternatively contained therein during operation to control the relative positions of the poison 44, and first and second fluids 46 and 48 to prevent overflow of liquid (e.g. poison 44 or fluid 48) between the legs of the second traps 56a. A conventional second valve 62 is preferably disposed in flow communication with the top of the reservoir 50 for channeling thereto a pressurizing fluid 64, such as nitrogen gas, from a conventional pressure accumulator or source 66, as well as for venting the fluid 64 from the reservoir 50 during operation to relieve pressure therein. In an exemplary embodiment, the system 40 is preferably closed with the reservoirs 50 and 56b and the first and second conduits 52 and 56 therebetween being disposed inside the reactor pressure vessel 12, as shown in FIG. 1, which is maintained at a nominal pressure of about 70 kg/cm$^2$. Either or both of the pressure sources 54 and 66 may be used for pressurizing the system 40 to the nominal pressure of the vessel 12, with the pressure source 54 being also effective for further increasing the pressure of the displacing fluid 58 for selectively displacing the poison 44, and the first and second fluids 46 and 48 as described above. Alternatively, the reservoirs 50 and 56b and the first and second traps 52a and 56a may be disposed outside the vessel 12 if desired.

In the three-fluid system 40 disclosed above, i.e. liquid poison 44, gaseous first fluid 46, and liquid second fluid 48, the fluids are substantially immiscible with each other at their respective interfaces, which thusly allows one to displace the other in turn as described above from the beginning of the cycle to the end of the cycle in order to harden and soften the neutron spectra, respectively. Also as described above, nitrogen gas is preferred for the first displacing fluid 46 since it has a low moderating ratio due to its heavy atomic mass weight (14) and high absorption cross section (1.75 barns at 0.025 eV). As shown in FIG. 2, the hollow control blades 42 may be used to replace at least some of the conventional solid control blades 34 and when filled with the nitrogen first fluid 46, they are effective for obtaining a moderating ratio which is lower than that provided by the water 28 which displaces the solid control blades 34 as they are withdrawn from the core 14. Accordingly, a relatively harder neutron spectra may be obtained in the core 14 using the control blades 42 instead of conventional solid control blades 34 at those locations. At the end interval of the core fuel cycle the nitrogen first fluid 46 may be displaced by the water second fluid 48 as described above to soften the neutron spectra to a relatively soft spectra for burning the converted fuel and thereby extending the core fuel cycle. The second fluid 48 may be light or heavy water, with heavy water being preferred since it has superior moderating properties due to its lower absorption cross section relative to light water. Although heavy water is relatively expensive, its use can be justified since little or no leakage or loss thereof will occur for the closed system 40.

Figure 5:
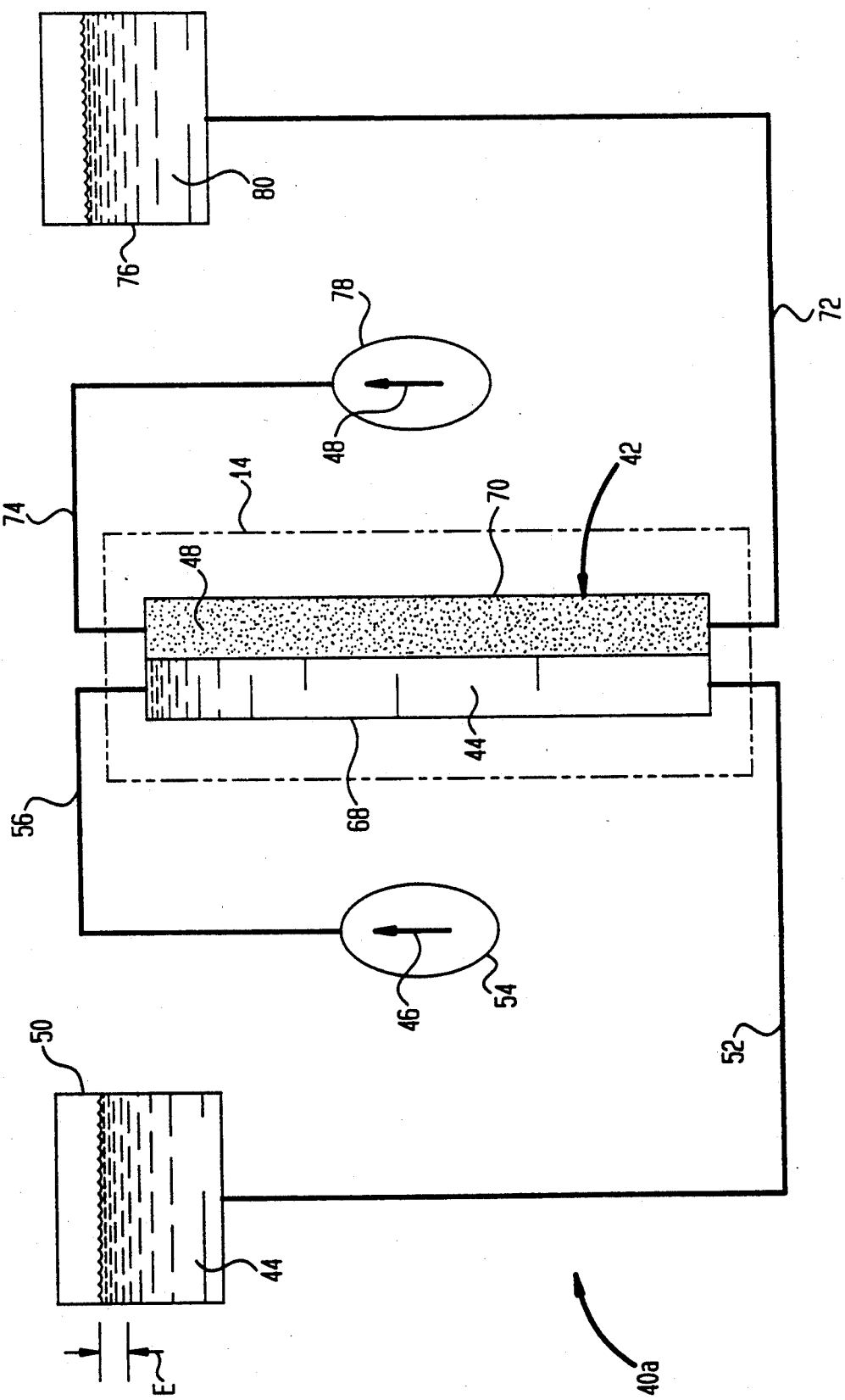
FIG. 5 is a schematic representation of a second embodiment of a neutron spectral shifting system usable in the reactor illustrated in FIG. 1 shown in the shutdown mode.

Illustrated in FIGS. 5–7 is a second embodiment of the system 40 designated 40a. In this embodiment, each of the control blades 42 includes two vertically extending chambers, i.e. a first chamber 68 and a second chamber 70 which are sealed from each other for preventing flow therebetween. The first chamber 68 is disposed in flow communication with the first and second conduits 52 and 56, respectively, for receiving the first fluid 46 from the second conduit 56 to displace the poison 44 from the first chamber 68 and into the reservoir 50 through the first conduit 52. As shown in FIG. 5, the system 40a is in the shutdown mode with the poison 44 completely filling the first chamber 68. The pressure source 54 is effective for providing the first fluid 46 under pressure through the second conduit 56 and into the first chamber 68 for displacing the poison 44 from the first chamber 68, through the first conduit 52 and into the reservoir 50 so that only the first fluid 46 remains in the first chamber 68 as illustrated in FIG. 6.

Referring again to FIG. 5, means in the exemplary form of third and fourth conduits 72 and 74 are disposed in flow communication with opposite ends of the second chamber 70, with the third conduit 72 being disposed in flow communication with a third reservoir 76, and the fourth conduit 74 being disposed in flow communication with a second pressure source 78. In this second embodiment, the second fluid 48 is initially disposed in the second chamber 70 by being pressurized by the second pressure source 78, which in turn displaces into the third reservoir 76 a third fluid 80 which is preferably liquid such as water. The second fluid 48 in this embodiment is preferably nitrogen gas, which upon cessation of pressure thereto by the second pressure source allows gravity to return the third fluid 80 into the second chamber 70. Accordingly, the system 40a is operated as shown in FIG. 5 for filling the first chamber 68 with the poison 44 and the second chamber 70 with the nitrogen second fluid 48 during the shutdown mode.

For obtaining the hard neutron spectra from the control blades 42, the poison 44 is displaced by the first fluid 46 which is preferably helium gas ($He_2$) which completely fills the first chamber 68 as illustrated in FIG. 6. And, the nitrogen second fluid 48 remains in the second chamber 70 displacing the water second fluid 48. Accordingly, the control blades 42 having both the first fluid 46 and the second fluid 48 in the respective first and second chambers 68 and 70 are effective for obtaining the hard neutron spectra due to the collective moderating ratios of the fluids 46, 48. With the control blade 42 being used instead of a conventional solid control blade 34 as illustrated in FIG. 2, the first and second fluids 46 and 48 also displace the water 28 which would be present upon withdrawal of one of the solid control blades 34 which would otherwise be at that location. This results in a lower moderating ratio than would occur conventionally with the water 28 at that location thusly providing a harder neutron spectra.

In order to obtain the soft neutron spectra, the helium first fluid 46 is allowed to remain in the first chamber 68 as illustrated in FIG. 7, and the pressure of the second fluid 48 is reduced by the second pressure source 78 (by venting for example) for allowing gravity to return the water third fluid 80 into the second chamber 70 to completely fill the second chamber 70, and therefore displace the second fluid 48 outwardly therefrom and through the fourth conduit 74. The moderating ratios of the helium first fluid 46 and the water third fluid 80 are substantially equal to each other and greater than the moderating ratio of the nitrogen second fluid 48.

As described above, the hollow control blades 42 may be in the form of the tubular inverted U-shaped traps shown in FIG. 3 for example, or the side-by-side first and second chambers 68 and 70 illustrated in FIG. 5 for example. Of course the hollow control blades 42 may take any convenient form such as for an additional example that shown in FIG. 8 including a radially spaced pair of concentric tubes, i.e. outer tube 82 and inner tube 84, defining two separate flow passages therein. When such a control blade is used in the first embodiment illustrated in FIG. 3, the respective first conduit 52 and second conduit 56 are disposed in flow communication with the tops and bottoms of the respective outer and inner tubes 82 and 84. When the control blade 42 is utilized in the second embodiment illustrated in FIG. 5, the bottom of the inner tube 84 is instead joined to the third conduit 72, with the top of the inner tube 84 being joined to the fourth conduit 74.

It should be apparent to artisans in reactor control design that the system shown in FIG. 5 is one of several alternatives and illustrates basic principles of operation. While suitable for some reactor designs, other reactor types may require modifications or additions in the detailed design to account, for example, for specific failure modes and effects in order to ensure acceptable consequences. It may be desirable, for example, to suitably reverse the order of the second fluid 48 and the third fluid 80 between the second pressure source 78 and the third reservoir 76 to avoid potential insertion of moderator into the reactor core 14 given the failure of the displacing pressure of the second pressure source 78. Such a contingency measure can be accomplished through the proper design of conduit and holding chamber geometries, for example, by providing U-tube traps and optimizing conduit line heights and diameters as described for the exemplary embodiment of the invention (i.e., FIGS. 3 and 4).

Figure 9:
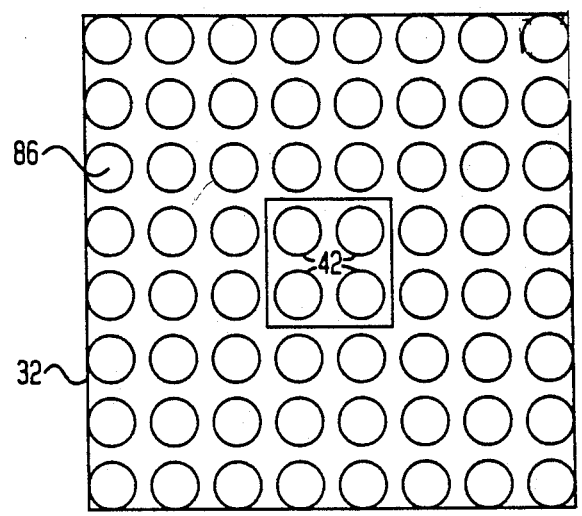
FIG. 9 is a transverse sectional view of one of the core fuel bundles contained in the core illustrated in FIG. 1 showing an alternate embodiment of hollow control blades disposed centrally therein.

Illustrated in FIG. 9 is an exemplary one of the fuel bundles 32 having a square transverse cross section and including a conventional eight-by-eight matrix of conventional fuel rods 86 with the four center ones of the fuel rods 86 being removed and replaced by the hollow control blades 42. The control blades 42 may be disposed between adjacent ones of the fuel bundles 32 as illustrated in FIG. 2, or within the selected ones of the fuel bundles 32 as illustrated in FIG. 9.

Figure 10:
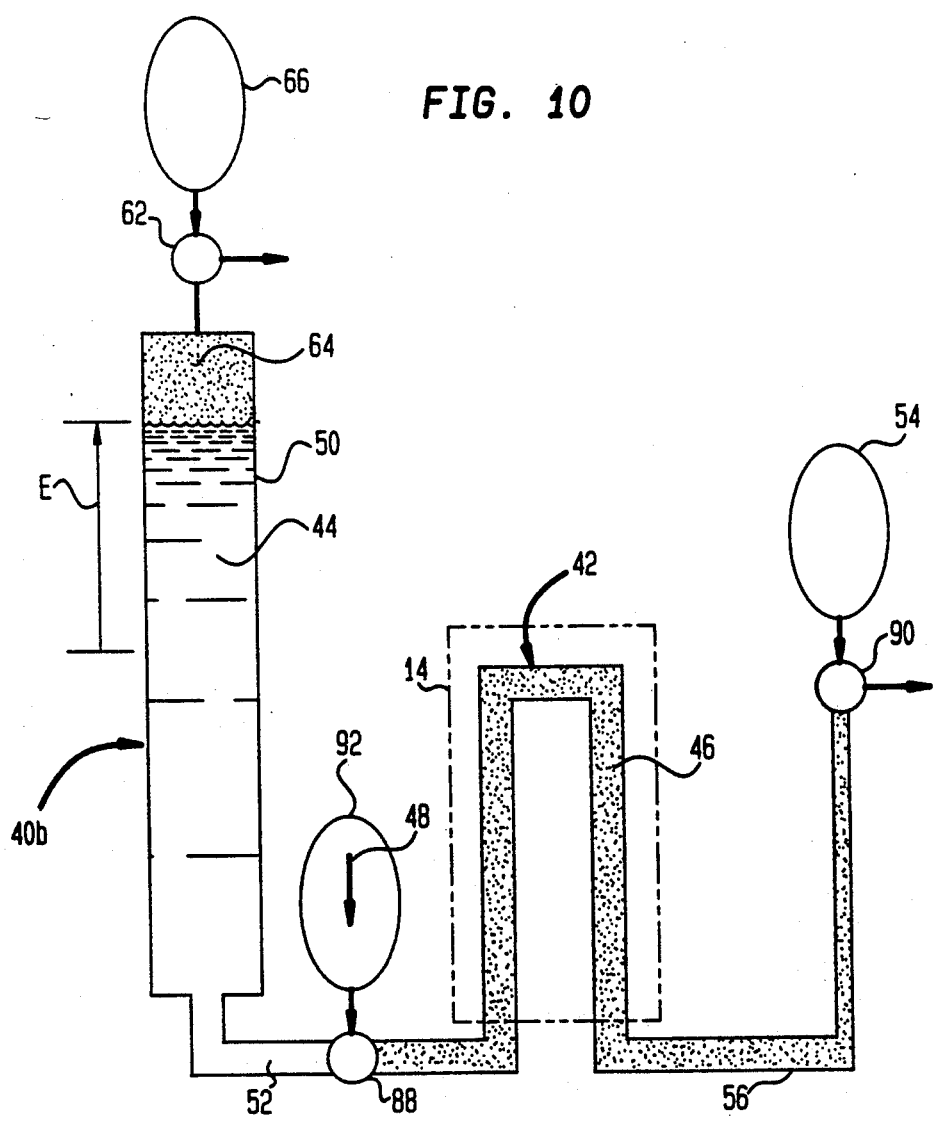
FIG. 10 is a schematic representation of a third embodiment of the neutron spectral shift system usable in the reactor illustrated in FIG. 1.

Illustrated in FIG. 10 is a third embodiment of the system 40 designated 40b. In this third embodiment, the pressure source 54 is again effective for pressurizing the first fluid 46, e.g. nitrogen gas, to displace the poison 44 from the hollow control blade 42 through the first conduit 52 and into the reservoir 50 for obtaining the hard neutron spectra in the core 14. However, in this third embodiment, instead of using a liquid second fluid 48, which is immiscible with the gaseous first fluid 46, the second fluid 48 may be gaseous, and preferably is helium gas ($He_2$). Since both the first and second fluids 46 and 48 are gases they are mixable with each other and therefore the first embodiment of the invention illustrated in FIGS. 1–4 may not be used. Instead, means for replacing the gaseous first fluid 46 from the control blade 42 with the gaseous second fluid are provided.

More specifically, a conventional admission valve 88 is disposed in flow communication in the first conduit 52 between the reservoir 50 and the control blade 42, and a conventional purge valve 90 is disposed in flow communication in the second conduit 56 at the end thereof adjacent to the pressure source 54. The admission valve 88 is positionable initially to allow unobstructed flow of the poison 44 between the reservoir 50 and the control blade 42 for either filling the control blade 42 with the poison 44 for obtaining shutdown, or displacing the poison 44 from the control blade 42 by the first fluid 46 for obtaining the hard neutron spectra. The admission valve 88 is also positionable to block return flow of the poison 44 into the control blade 42 while the first fluid 46 is contained therein so that a conventional supplying means 92, such as a high pressure accumulator, can provide the gaseous second fluid 48 through the admission valve 88 and into the control blade 42 to displace or purge the first fluid 46 therefrom through the second conduit 56 and out the purge valve 90. The purge valve 90 is initially positionable to allow pressure source 54 to pressurize the first fluid 46 for displacing the poison 44 from the control blade 42, and is also positionable to vent the second conduit 56 so that the first fluid 46 may be purged from the control blade 42 and replaced by the second fluid 48 for obtaining the soft neutron spectra in the core 14.

In all three of the embodiments disclosed above gravity is effective for returning the poison 44 to the control blades 42 to shut down the reactor core 14 automatically upon loss of displacing pressure either intentionally or by system failure. The hollow control blades 42 allow the poison 44 to be displaced with the first fluid 46 which may either be a gas, such as nitrogen or helium, as described above or a liquid for obtaining the hard neutron spectra in the core 14. The first fluid 46 may either be displaced or replaced by the second fluid 48 as described above having a higher moderating ratio for shifting or softening the neutron spectra. The second fluid 48 may also be either a gas or liquid as described above.

Also as described above, the poison 44 may be sodium pentaborate in a water solution which is therefore mixable with the water second fluid 48 and must be suitably separated therefrom by the gaseous first fluid 46 for example. In order to further prevent mixing of the poison 44 and the first and second fluids 46 and 48, the first and second conduits 52 and 56 and the control blades 42 may comprise a plurality of relatively small parallel tubes wherein adhesion of the poison 44 to the inner surfaces thereof assists in preventing mixing with the first or second fluids 46 and 48. In alternate embodiments of the invention, the poison 44 may be liquid mercury which is immiscible with water and has relatively poor adhesion to the inner surfaces of the control blades 42 which ensures not only the prevention of mixing of the poison 44 with the first or second fluids 46 and 48 but also decreases any poison residues within the control blades 42 which would rob neutrons during operation of the core 14.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. In a nuclear reactor core having fuel bundles and hollow control blades, a method for affecting neutron spectral shift during a core fuel cycle including beginning and end intervals comprising:
   providing a liquid poison in said blades for reducing nuclear reactivity in said core;
   displacing said liquid poison in at least a first one of said blades with a first fluid having a first moderating ratio for obtaining a hard neutron spectra adjacent to said first blade during said cycle beginning interval for converting fertile fuel in said fuel bundles to fissile fuel; and
   increasing moderating ratio of said first blade using a second fluid for obtaining a soft neutron spectra adjacent to said first blade during said cycle end interval for burning said fissile fuel.

2. A method according to claim 1 further including displacing said liquid poison in said first blade with said first fluid against the force of gravity acting on said liquid poison so that said liquid poison is automatically returned into said first blade by gravity upon cessation of said displacing step.

3. A method according to claim 2 further including displacing said first fluid in said first blade with said second fluid having a second moderating ratio greater than said first moderating ratio for obtaining said soft neutron spectra.

4. A method according to claim 3 wherein said first and second fluids are gases.

5. A method according to claim 4 wherein said first fluid is helium and said second fluid is nitrogen.

6. A method according to claim 3 wherein said first fluid is a gas and said second fluid is a liquid.

7. A method according to claim 6 wherein said first fluid is nitrogen and said second fluid is light or heavy water.

8. A method according to claim 2 wherein said first control blade includes two chambers, said first fluid is disposed in one of said chambers, and said moderating ratio increasing step is obtained by providing said second fluid into said other chamber, said second fluid having a second moderating ratio for collectively affecting with said first fluid said soft neutron spectra.

9. A system for affecting neutron spectral shift comprising:
   a nuclear reactor core including fuel bundles and hollow control blades, and operable over a core fuel cycle including beginning and end intervals for generating power;
   means for providing a liquid nuclear poison in said blades for reducing nuclear reactivity in said core;
   means for displacing said liquid poison from at least a first one of said blades with a first fluid having a first moderating ratio for obtaining a hard neutron spectra adjacent to said first blade during said cycle beginning interval for converting fertile fuel in said fuel bundles to fissile fuel; and
   means for increasing moderating ratio effected by said first blade using a second fluid for shifting said hard neutron spectra to a soft neutron spectra adjacent to said first blade during said cycle end interval for burning said fissile fuel.

10. A system according to claim 9 wherein said liquid poison providing means include:
    a poison reservoir including said liquid poison;
    a first conduit joining said reservoir in flow communication with said first blade; and said poison reservoir being elevated at least in part higher than said first blade so that gravity acting on said liquid poison in said poison reservoir is effective for moving said liquid poison through said first conduit for completely filling said first blade with said poison upon cessation of said liquid poison displacing means.

11. A system according to claim 10 wherein said displacing means include:
a pressure source;
a second conduit joining said pressure source in flow communication with said first blade and containing said first fluid; and
said pressure source being effective for selectively pressurizing said first fluid to selectively displace said poison from said first blade and into said poison reservoir.

12. A system according to claim 11 wherein said moderating ratio increasing means include:
said second conduit containing both said first fluid and said second fluid having a second moderating ratio greater than said first moderating ratio, said first fluid being disposed between said poison and said second fluid; and
said pressure source being effective for selectively pressurizing said second fluid for displacing in turn said first fluid and said poison so that only said first fluid is in said first blade during said beginning interval for obtaining said hard neutron spectra, and only said second fluid is in said first blade during said end interval for obtaining said soft neutron spectra.

13. A system according to claim 12 wherein:
said first control blade is in the form of an inverted U-shaped trap;
said first conduit includes an inverted U-shaped first trap;
said second conduit includes an inverted U-shaped second trap;
said first fluid is a gas and said second fluid is a liquid; and
said first, second, and blade traps are effective for preventing mixing together of said liquid poison, said first fluid, and said second fluid.

14. A system according to claim 13 wherein said first, second, and blade traps have respective first, second, and third heights selected so that said liquid second fluid is disposed fully in said first control blade and between said first and second traps for obtaining said soft neutron spectra during said end interval.

15. A system according to claim 14 wherein said pressure source provides a pressurized third fluid in the form of a gas for displacing said second fluid and in turn said first fluid and said liquid poison, said third fluid being disposed in said second trap during said end interval.

16. A system according to claim 15 wherein said second conduit further includes a second reservoir disposed in flow communication between said second trap and said pressure source for receiving at least part of said second fluid from said second conduit upon depressurization of said second fluid.

17. A system according to claim 16 further including a plurality of said first control blades disposed in parallel flow with said first and second conduits.

18. A system according to claim 11 further including means for replacing said first fluid from said first blade with said second fluid having a second moderating ratio greater than said first moderating ratio for obtaining said soft neutron spectra.

19. A system according to claim 18 wherein said first fluid replacing means include:
an admission valve disposed in flow communication in said first conduit;
a purge valve disposed in flow communication in said second conduit;
means for supplying said second fluid; and
said admission valve being positionable to block flow of said poison into said first blade while allowing said supplying means to provide said second fluid into said first blade to displace said first fluid which in turn is vented through said second conduit and out said second valve.

20. A system according to claim 11 wherein:
said first control blade includes first and second chambers, said first chamber being joined in flow communication with said first and second conduits for receiving said first fluid to displace said liquid poison;
means for providing alternatively in said second chamber said second fluid and a third fluid having respective second and third moderating ratios; and
said first chamber containing either said liquid poison or said first fluid when said second chamber contains said second fluid, and said first fluid when said second chamber contains said third fluid, so that said first blade is effective for reducing reactivity when containing said liquid poison, obtaining said hard neutron spectra when containing both said first and second fluids, and obtaining said soft neutron spectra when containing both said first and third fluids.

21. A system according to claim 20 wherein said first fluid is helium gas, said second fluid is nitrogen gas, and said third fluid is water.

* * * * *